July 12, 1960 C. BARTSCH 2,944,350
ROTARY LOADING AND SCRAPING MACHINE
Filed Dec. 16, 1955 2 Sheets-Sheet 1
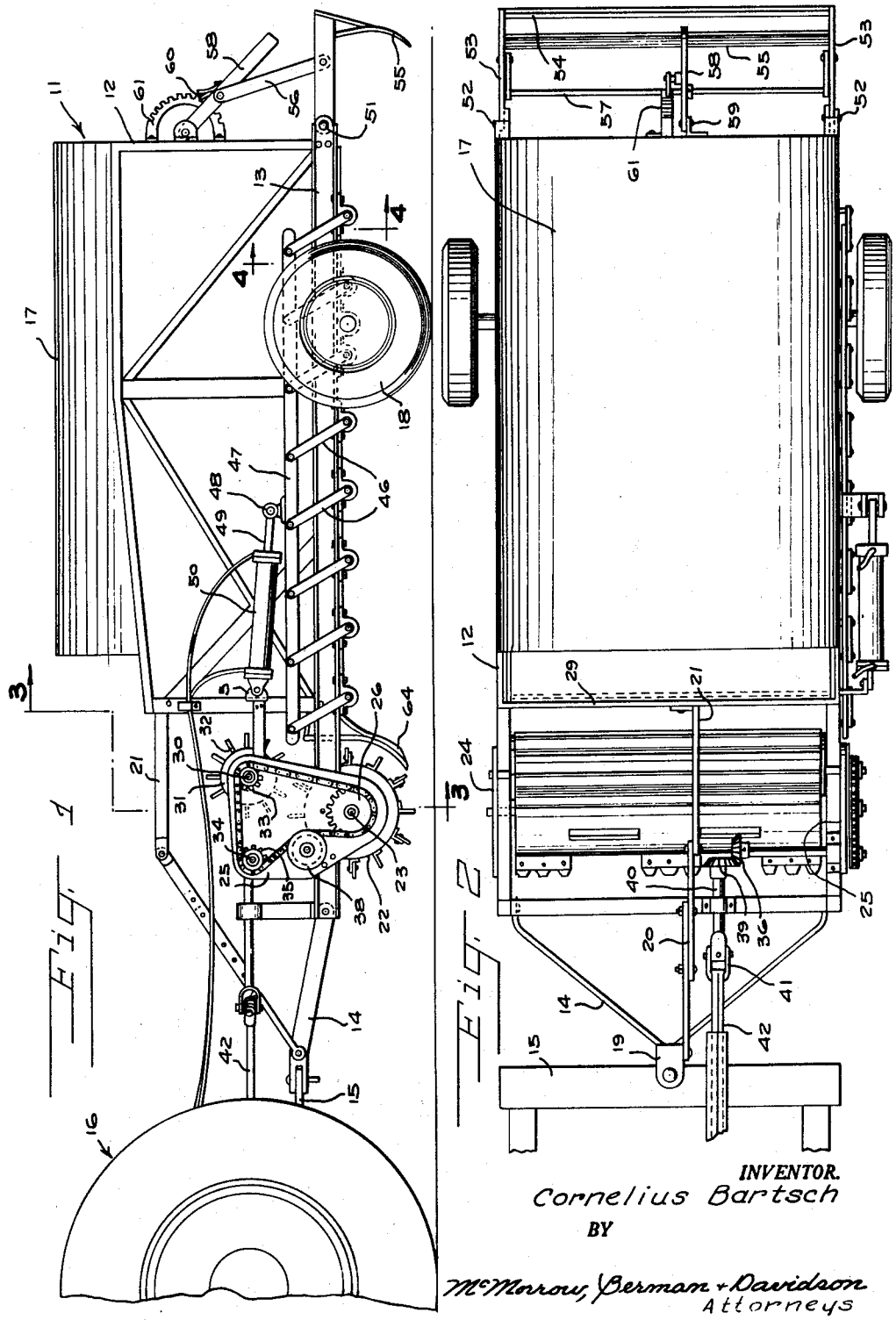
INVENTOR.
Cornelius Bartsch
BY
McMorrow, Berman + Davidson
Attorneys

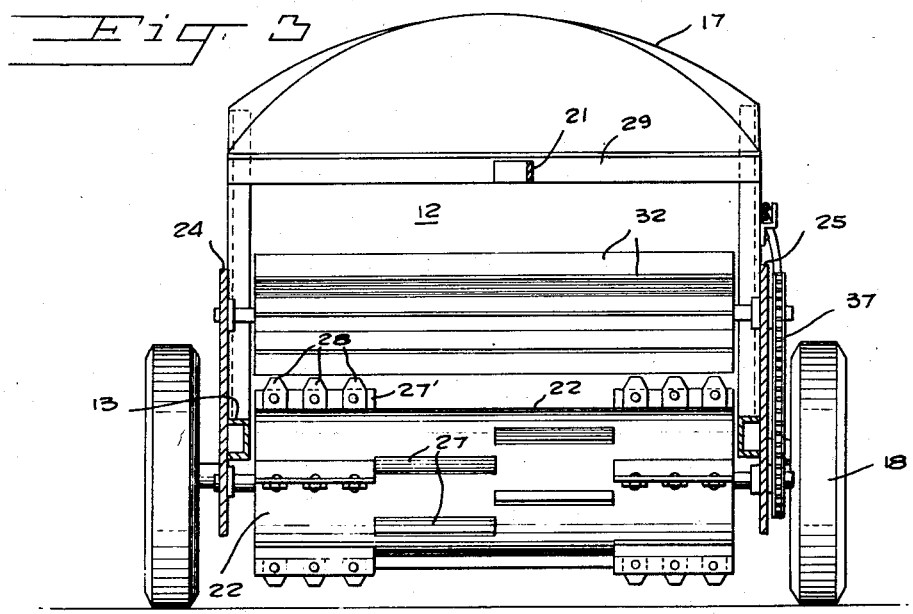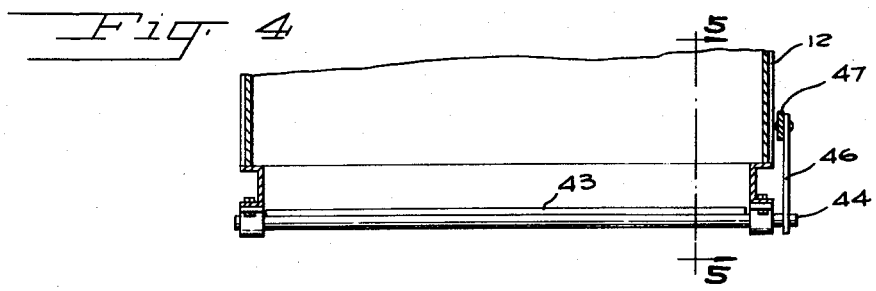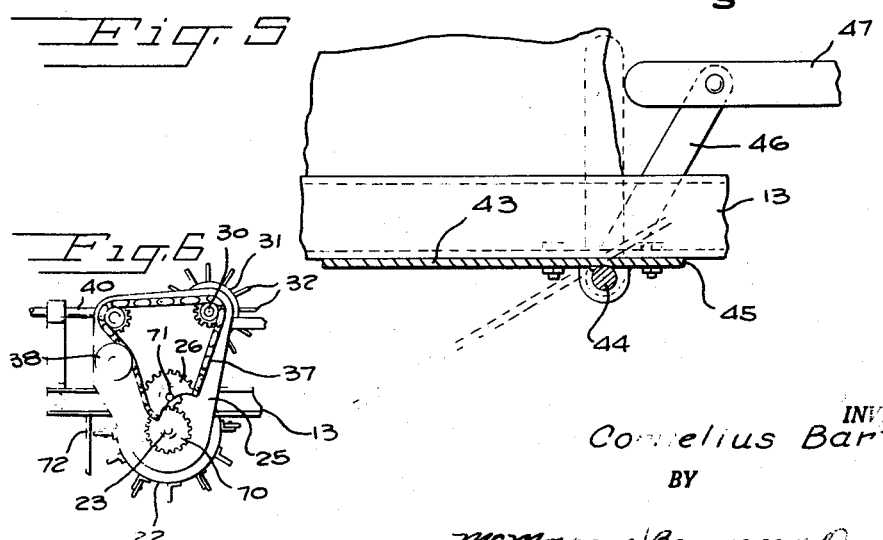

United States Patent Office 2,944,350
Patented July 12, 1960

2,944,350

ROTARY LOADING AND SCRAPING MACHINE

Cornelius Bartsch, Rte. 1, Box 327A, Dinuba, Calif.

Filed Dec. 16, 1955, Ser. No. 553,551

4 Claims. (Cl. 37—4)

This invention relates to excavating or scraping machines, and more particularly to an improved scraping and loading machine of the type having a rotary scraping element.

A main object of the invention is to provide a novel and improved excavating or scraping machine which may be attached to a tractor, or similar tractive vehicle, and which may be drawn along the course of travel of the tractor vehicle, the improved scraping machine being simple in construction, being easy to operate, and providing means for efficiently loading the machine with the material scraped from the ground and for efficiently dumping such material, when desired.

A further object of the invention is to provide an improved scraping and loading machine of the type having a transverse rotary scraping member, said machine being relatively inexpensive to fabricate, being rugged in construction, and being provided with means for leveling the ground following the initial scraping and excavating action of the machine.

Further objects and advantages of the invention will become apparent from the following description and claims, and from the accompanying drawings, wherein:

Figure 1 is a side elevational view of an improved scraping and loading machine constructed in accordance with the present invention.

Figure 2 is a top view of the machine of Figure 1.

Figure 3 is an enlarged transverse vertical cross sectional view taken on line 3—3 of Figure 1.

Figure 4 is a vertical cross sectional detail view taken on line 4—4 of Figure 1.

Figure 5 is an enlarged cross sectional detail view taken on line 5—5 of Figure 4.

Figure 6 is a fragmentary elevational view showing a modified driving arrangement for the transverse rotary scraping member of the machine, whereby the direction of rotation of said transverse rotary scraping member is reversed as compared with its direction of rotation in the machine of Figure 1.

Referring to the drawings, and more particularly to Figures 1 to 5, 11 generally designates the improved rotary scraping and loading machine, said machine constituting an improvement over the machine disclosed in my previously issued Patent No. 2,587,092, issued February 26, 1952.

The improved machine 11 comprises a wheeled container 12 having the frame 13, said frame being provided at its forward end with a hitch structure 14 adapted to be connected to the transverse draw bar 15 of a conventional tractor 16. The container 12 is provided with the arched top cover 17 which overlies the major portion of the container, as is clearly shown in Figures 1 and 2. The container 12 is provided with the wheels 18 journaled on opposite sides of the frame 13, said wheels being located at the rear portion of the frame, as shown. The forward portion of the container 12 is connected to the hitch element 19 of the hitch structure 14 by an adjustable link member 20 which connects the element 19 to an arm 21 rigidly secured to the forward end of the container 12. The container 12 is thus rigidly secured to the frame 13 not only at its lower portion but also at its upper portion. The forward portion of container 12 may be raised or lowered, as desired, by raising or lowering the tractor draw bar 15 by means of the conventional structure provided on the tractor for this purpose.

Designated generally at 22 is a transverse rotary scraper cylinder which is rotatably mounted on the forward end portion of the frame 13, the cylinder 22 being mounted on a transverse shaft 23 journaled between vertical bracket plates 24 and 25 secured to the opposite sides of frame 13 at its forward portion, as shown in Figure 2. Secured to the shaft 13 externally adjacent bracket plate 25 is a sprocket wheel 26.

Secured on the cylinder 22 are the spaced, radially extending, generally rectangular scraping blades 27 and also secured on the cylinder 22 are radial blade elements 27' provided with outwardly projecting scraping teeth 28, as shown in Figure 3. The teeth 28 project outwardly beyond the edges of the blade elements 27' and provide a ground-pulverizing action which enables the device to break up hard ground.

The forward end of the container 12 is open, a transverse cross bar 29 extending across the top forward corners of the container to brace the forward end of the container, the arm 21 being secured to an intermediate portion of the cross bar 29, as shown in Figure 2. Journaled in the top portions of the upstanding bracket plates 24 and 25 above and spaced slightly rearwardly of the shaft 23 is a transverse shaft 30 on which is mounted a cylinder 31 provided with the spaced, radially extending conveyor blades 32, the blades 32 being substantially coextensive in length with the cylinder 22, as shown in Figure 3. As shown in Figure 3, the respective radial scraping and abrading blade elements 27 and 27' are of relatively short length and are staggered around the surface of the cylinder 22.

Secured on the end of the shaft 30 adjacent the bracket plate 25 is a sprocket wheel 33. A drive shaft 34 is journaled in the upper portion of plate 25, said shaft 34 having a sprocket wheel 35 secured on its outer end and being provided on its inner end with a bevel gear 36. A sprocket chain 37 is engaged over the sprocket wheels 26, 33 and 35, the chain 37 being tensioned by a suitable idler wheel 38 located between the sprocket wheels 35 and 26, as shown in Figure 1.

Bevel gear 36 meshingly engages a bevel gear 39 carried on the end of a longitudinal shaft 40 which is coupled through a universal joint 41 to a drive shaft 42, the drive shaft 42 being suitably connected to the power take-off shaft of the tractor 16.

A plurality of transverse dumping plates 43 are pivoted in the bottom of the container 12 on respective transverse axes spaced forwardly from their transverse rear edges. Thus, as shown in Figure 5, each dumping plate 43 is secured to a transverse shaft 44 which is spaced forwardly from the transverse rear edge 45 of the plate 43, whereby a substantial portion of the dumping plate 43 is elevated into the container 12 when the dumping plate 43 is rotated counterclockwise, as viewed in Figure 5, from its normal, horizontal closed position, to its depending, open position, shown in dotted view in Figure 5. The elevation of the rear portion of the dumping plate provides a means for breaking up packed material, such as packed sod, or the like, deposited in the container 12, greatly facilitating the complete and free discharge of the material from the container when it is desired to dump the same.

Rigidly connected to the ends of the respective transverse shaft 44 are link bars 46, said link bars being located on the same side of the container 12 as the upstanding bracket plate 25. The ends of the link bars 46 are pivotally connected to a common longitudinal link bar 47, said link bar being pivotally connected at 48 to the piston rod 49 of a fluid-pressure operated cylinder 50 pivoted at 51 to the forward portion of the side wall of the container 12, as shown in Figure 1. The cylinder 50 is operated by the fluid pressure means of the tractor 16, whereby the plates 43 may be rotated to depending dumping positions when desired by introducing fluid pressure in the cylinder 50 to cause the piston rod 49 to be retracted into the cylinder from the normal position thereof shown in Figure 1, causing the link arms 46 to be rotated counterclockwise.

Conversely, to raise the plates 43 to their horizontal, closed positions, fluid pressure is introduced into the cylinder 50 in a direction to extend the piston rod 49, causing the link arms to be rotated clockwise, as viewed in Figure 1, whereby the plates 43 are elevated to their horizontal, closed positions.

Pivoted to the rear ends of frame 13 at 52, 52 are respective support arms 53, 53 rigidly connected by a transverse bar 54. Secured to the bar 54 is a depending transverse scraping blade 55. The arms 53 are connected by link bars 56 to a transverse rod 57. Secured to the intermediate portion of rod 57 is a lever 58 which is pivoted at 59 to the rear wall of container 12, the lever 59 being provided with a ratchet dog 60 lockingly engageable with a toothed ratchet plate 61, the dog 60 being thus releasably engageable with the teeth of the ratchet member 61 to lock the lever 58 in a desired position of angular adjustment with respect to the arcuate toothed member 61 with which the pivotal connection 59 of the lever is concentric. The transverse rear scraping blade 55 may thus be adjusted to a desired position by means of the lever 58.

Secured to the forward end of the container 12 is the depending, forwardly and downwardly curved guide plate 64 extending transversely for substantially the entire width of the forward end of the container 12 and being arranged adjacent the path of travel of the rotary blade elements 27 and 27' to define guide means for guiding scraped material upwardly into the forward portion of the container 12. The scraped material is guided vertically upwardly and is engaged by the blades 32 of the cylinder 31, said cylinder 31 being rotated simultaneously with the cylinder 22, preferably at a somewhat greater speed. In the arrangement of Figure 1, the cylinders 31 and 22 rotate counterclockwise, the scraped material being thus thrown upwardly by the blades 27 and 27' on cylinder 22 and being engaged by the blades 32 of cylinder 31 and thus being projected rearwardly into the receptacle 12.

Figure 6 illustrates a modified arrangement wherein the shaft 23 is provided with a reversing gear 70 which meshingly engages a gear carried on a reversing shaft 71, the sprocket wheel 26 being mounted on the shaft 71, whereby the sprocket chain 37 drives shaft 71 in the same direction as shaft 30, whereby the cylinder 22 rotates in a direction opposite to the direction of rotation of the cylinder 31. Thus, cylinder 31 rotates counterclockwise, as viewed in Figure 6, whereas the cylinder 22 rotates clockwise. A depending baffle or guide plate 72 is secured on the frame 13 forwardly adjacent the cylinder 22, guiding the scraped material upwardly and rearwardly above the cylinder 22, said scraped material being engaged by the conveying blades 32 of cylinder 31, whereby said material is projected rearwardly into the container 12.

As above explained, the elevation of the forward portion of the container 12 is adjustable by means of the adjustment provided for the tractor draw bar 15, whereby the scraping cylinder 22 may be raised or lowered, in accordance with the type of ground being worked. Similarly, the height of the rear scraper blade 55 may be adjusted by means of lever 58 to provide a desired scraping and leveling action at the rear of the machine.

While certain specific embodiments of an improved scraping and loading machine have been described in the foregoing description, it will be understood that various modifications within the spirit of the invention may occur to those skilled in the art. Therefore it is intended that no limitations be placed on the invention except as defined by the scope of the appended claims.

What is claimed is:

1. In a scraping and loading machine of the type comprising a wheeled container having its forward end open and being adapted to be connected to a tractor, a transverse cylinder rotatably mounted on the forward end of the container adjacent the bottom thereof, a plurality of longitudinally spaced ground-engaging rectangular radial scraping blades of substantial length on said cylinder, a plurality of longitudinal rows of radial outwardly projecting ground-engaging pulverizing teeth on said cylinder, said rows being staggered with respect to said scraping blades, a transverse conveying rotor rotatably mounted on the forward end of the container above and adjacent said cylinder, said conveying rotor being provided with a plurality of radial rectangular conveyor blades substantially coextensive in length therewith, and drive means connected to said cylinder and conveying rotor and simultaneously rotating same in directions to propel scraped material into the forward end of the container.

2. In a scraping and loading machine of the type comprising a wheeled container having its forward end open and being adapted to be connected to a tractor, a transverse cylinder rotatably mounted on the forward end of the container adjacent the bottom therof, a plurality of longitudinally spaced ground-engaging rectangular radial scraping blades of substantial length on said cylinder, a plurality of longitudinal rows of radial outwardly projecting ground-engaging pulverizing teeth on said cylinder, said rows being staggered with respect to said scraping blades, a transverse conveying rotor rotatably mounted on the forward end of the container above and rearwardly adjacent said cylinder, said conveying rotor being provided with a plurality of radial rectangular conveyor blades substantially coextensive in length therewith, a depending transverse guide plate mounted adjacent and below the open forward end of the container and adjacent said cylinder, and drive means connected to said cylinder and conveying rotor and simultaneously rotating same in directions to propel scraped material against said guide plate and into the forward end of the container.

3. In a scraping and loading machine of the type comprising a wheeled container having its forward end open and being adapted to be connected to a tractor, upstanding opposing vertical plate members mounted on the opposite sides of the forward end of said container, a transverse cylinder rotatably mounted between and journaled in the lower portions of said vertical plate members below and forwardly adjacent the open end of the container, a plurality of longitudinally spaced ground-engaging rectangular radial scraping blades of substantial length on said cylinder, a plurality of longitudinal rows of radial outwardly projecting ground-engaging pulverizing teeth on said cylinder, said rows being staggered with respect to said scraping blades, a transverse conveying rotor rotatably mounted between and journaled in the upper portions of said vertical plate members above and rearwardly adjacent said cylinder, said conveying rotor being provided with a plurality of radial rectangular conveyor blades substantially coextensive in length therewith, and drive means connected to said cylinder and conveying rotor and simultaneously rotating the same in directions to propel scraped material into the forward end of the container.

4. In a scraping and loading machine of the type comprising a wheeled container having its forward end open and being adapted to be connected to a tractor, upstanding opposing vertical plate members mounted on the opposite sides of the forward ends of said container, a transverse cylinder rotatably mounted between and journaled in the lower portions of said vertical plate members below and forwardly adjacent the open end of the container, a plurality of longitudinally spaced ground-engaging rectangular radial scraping blades of substantial length on said cylinder, a plurality of longitudinal rows of radial outwardly projecting ground-engaging pulverizing teeth on said cylinder, said rows being staggered with respect to said scraping blades, a transverse conveying rotor rotatably mounted between and journaled in the upper portions of said vertical plate members above and rearwardly adjacent said cylinder, said conveying rotor being provided with a plurality of radial rectangular conveyor blades substantially coextensive in length therewith, a depending transverse guide plate mounted adjacent and below the open forward end of the container and adjacent said cylinder, and drive means connected to said cylinder and conveying rotor and simultaneously rotating same in directions to propel scraped material against said guide plate and into the forward end of the container, said guide plate extending substantially for the entire width of the container.

References Cited in the file of this patent

UNITED STATES PATENTS

| | | |
|---|---|---|
| 901,431 | Fenwick | Oct. 20, 1908 |
| 987,612 | Butler | Mar. 21, 1911 |
| 1,003,149 | Pascal | Sept. 12, 1911 |
| 1,296,347 | Werts et al. | Mar. 4, 1919 |
| 1,468,528 | Vena | Sept. 18, 1923 |
| 2,360,126 | Griffiths | Oct. 10, 1944 |
| 2,587,092 | Bartsch | Feb. 26, 1952 |
| 2,755,092 | Donahoe | July 17, 1956 |